Feb. 25, 1930. E. JEVNE 1,748,652
WAGON SEAT
Filed June 4, 1928
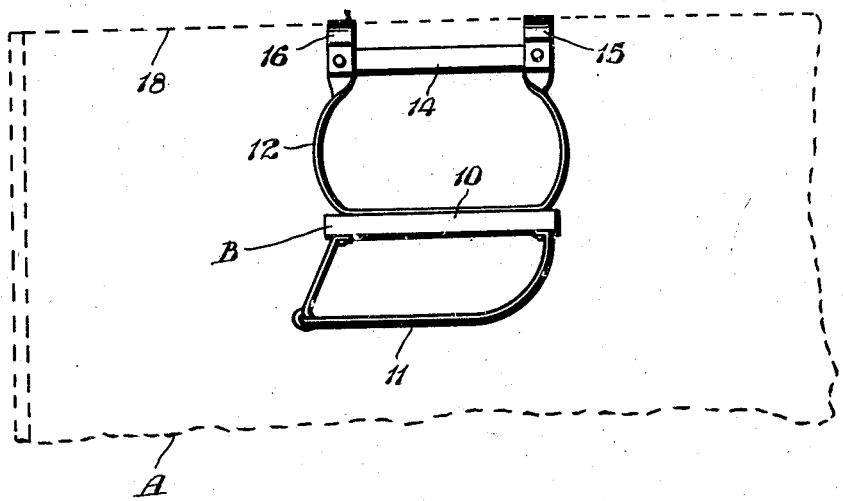
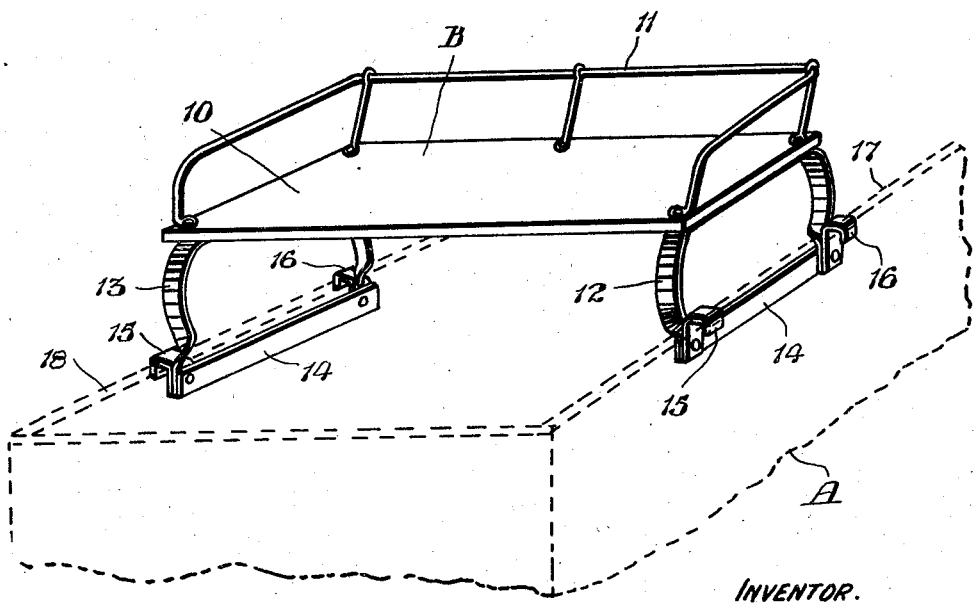
INVENTOR.
EVAN JEVNE.

Patented Feb. 25, 1930

1,748,652

UNITED STATES PATENT OFFICE

EVAN JEVNE, OF WETASKIWIN, ALBERTA, CANADA

WAGON SEAT

Application filed June 4, 1928, Serial No. 282,843, and in Canada June 4, 1927.

This invention relates to improvements in wagon seats and the object of the invention is to provide an improved seat adapted to fit on the top of the box when the wagon is loaded and which is reversible when the wagon is empty to permit the driver's feet to rest on the bottom of the box.

With these and other objects more fully referred to in view the invention consists in the novel combination, construction and arrangement of parts as hereinafter described and illustrated by the accompanying drawings.

Referring now to the drawings in which like characters of reference indicate corresponding parts in each figure Figure 1 is a perspective view of the seat on the box with dotted lines showing the body or box of the wagon.

Figure 2 is an end view of the seat in reversed position.

Referring now more particularly to the drawings in which a preferred example of my invention is disclosed, A designates the wagon box and B the seat as a whole comprising a seating portion 10 with a guard rail 11 on three sides of the upper side. At each end of the seating portion 10 are rigidly secured suitably bent spring strips 12 and 13 connected by cross bars 14 at their loose ends and having thereon pivotally mounted clips 15 and 16 adapted to engage with the top of the sides 17 and 18 of the box A.

When the box is empty and it is desired to permit the occupier of the seat to rest his feet on the bottom of the box the clips or clamping members 15 and 16 on each side are disengaged from the side of the box and the seat swung to reverse position into the box when the disengaged clips will again be available to engage with the sides of the box (see Figure 2) with the seat in reverse or upside down position within the box.

This arrangement of the seat will be particularly valuable for farmers hauling their produce long distances to town who can when the wagon is loaded fix their seat on the top of the box and rest their feet on the load and when the wagon is empty still have a rest for their feet by swinging the seat within the box and resting their feet on the bottom.

The seat can be readily turned by means of the pivoted clamping or clip members 15 and 16 from normal position above the box to reverse position within the box.

As many changes could be made in the above construction and many apparently widely different embodiments of my invention, within the scope of the claim construced, without departing from the spirit or scope thereof, it is intended that all matter contained in the accompanying specification and drawings shall be interpreted as illustrative and not in a limiting sense.

What I claim as my invention is:

A wagon seat comprising a seating portion, downwardly depending spring strips attached at the ends of said seating portion, cross bars connecting the ends of the spring strips, clamping members pivotally attached to the spring strips and the cross bars at their point of joining, said clamping members being adapted to support the seat in normal position and in reversed suspended position respectively as and for the purpose specified.

In witness whereof I have hereunto set my hand.

EVAN JEVNE.